United States Patent [19]

Horie et al.

[11] 4,341,853
[45] Jul. 27, 1982

[54] SPECTRAL SENSITIZATION OF ORGANIC PHOTOCONDUCTORS WITH DIAZASTRYL DYES

[75] Inventors: Seiji Horie; Hideo Sato, both of Asaka, Japan

[73] Assignee: Fuji Photo Film Co., Ltd., Kanagawa, Japan

[21] Appl. No.: 212,652

[22] Filed: Dec. 3, 1980

[30] Foreign Application Priority Data

Dec. 3, 1979 [JP] Japan .................................. 54-155592

[51] Int. Cl.³ ............................................. G03G 5/04
[52] U.S. Cl. ........................................ 430/83; 430/81; 430/82; 430/580; 430/581
[58] Field of Search ..................... 430/83, 81, 82, 580, 430/581

[56] References Cited

U.S. PATENT DOCUMENTS 4,018,606  4/1977  Cointois ............................ 430/83 X Primary Examiner—John D. Welsh
Attorney, Agent, or Firm—Sughrue, Mion, Zinn, Macpeak & Seas

[57] ABSTRACT

Photoconductive compositions and materials including photoconductive substances and spectral sensitizers, are described; the sensitizers comprise diazastyryl dyes represented by formula (I)

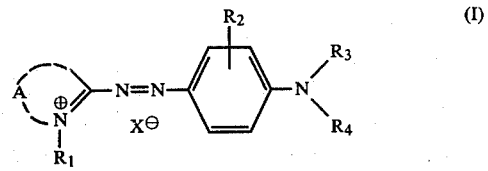

wherein $R_1$ represents an alkyl group, $R_2$ represents hydrogen, an alkyl group or an alkoxy group, $R_3$ and $R_4$ each represent an alkyl group or $R_3$ and $R_4$ together represent a group completing nitrogen-containing heterocyclic groups and A represents a group completing (a) benzothiazolium ring, (b) thiazolium ring, (c) imidazolium ring, (d) triazolium ring, (e) thiadiazolium ring, (f) pyridinium ring, (g) indazolium ring or (h) indolenium ring.

11 Claims, 4 Drawing Figures

SPECTRAL SENSITIZATION OF ORGANIC PHOTOCONDUCTORS WITH DIAZASTRYL DYES

BACKGROUND OF THE INVENTION

This invention relates to photoconductive compositions and materials containing photoconductive substances and spectral sensitizers. More particularly, this invention relates to photoconductive compositions and materials containing photoconductive substances and spectral sensitizers for photoconductive substances which are diazastyryl dyes.

Hitherto, many organic compounds have been known as photoconductive substances for electrophotographic sensitive materials. Among them, some compounds have been confirmed to have relatively high sensitivity. Under existing circumstances, however, there are very few cases wherein an organic photoconductive substance has been practically used for the electrophotographic sensitive materials. Organic photoconductive substances have many excellent properties as compared with inorganic photoconductive substances, and have possibilities of various utilizations in the field of electrophotography. For example, production of transparent photosensitive films, flexible sensitive films and lightweight sensitive films capable of easy handling become possible by use of organic photoconductive substances. Further, they have characteristics which can not be expected in inorganic photoconductive substances, for example, a film-forming property for production of sensitive materials, surface smoothness, and selectivity of charge polarity when applied to an electrophotographic copying process, etc. However, organic photoconductive substances have not sufficiently contributed to the field of electrophotography up to now in spite of having such various excellent characteristics in many viewpoints, because they generally have low sensitivity to light.

Generally, in case that the sensitivity of the photoconductive substance itself is low and is in a range of short wavelength spectra, certain substances may be added in order to increase the sensitivity and to transfer the sensitivity to a range of longer wavelength spectra.

As sensitizers for improving the sensitivity, though many organic substances have been known, they each have disadvantages together with advantages and there is no completely satisfactory sensitizer in the viewpoint of improving the sensitizing effect. Therefore, it is a subject desired for a long time by persons skilled in the art to develop more effective spectral sensitizers for organic photoconductive substances.

SUMMARY OF THE INVENTION

Therefore, an object of the present invention is to provide photoconductive compositions and materials containing photoconductive substances and spectral sensitizers which provide a high sensitization effect to the photoconductive substances.

Another object of the present invention is to provide photoconductive compositions and materials containing photoconductive substances and spectral sensitizers having excellent stability with respect to light which are capable of showing a desired spectral sensitization characteristics such as blue-sensitization, green-sensitization, and red-sensitization, by selecting a diazo moiety and a coupling moiety to form a spectral sensitizer molecule.

A further object of the present invention is to provide photoconductive compositions and materials containing photoconductive substances and economically advantageous spectral sensitizers.

Accordingly, photoconductive compositions and materials of the present invention for attaining the above described objects comprise photoconductive substances spectral sensitizers comprising diazastyryl dyes represented by formula (I)

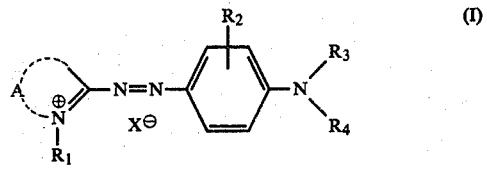

where $R_1$ represents an alkyl group, $R_2$ represents hydrogen, an alkyl group, or an alkoxy group, $R_3$ and $R_4$ each represent an alkyl group having or not having substituents, or $R_3$ and $R_4$ together represent a group completing a nitrogen containing heterocycle by linking $R_3$ to $R_4$, and $R_3$ and $R_4$ may be identical or different each other, and A represents a group of forming (a) benzothiazolium ring, (b) thiazolium ring, (c) imidazolium ring, (d) triazolium ring, (e) thiadiazolium ring, (f) pyridinium ring, (g) indazolium ring or (h) indolenium ring.

DETAILED DESCRIPTION OF THE INVENTION

Figure 1:
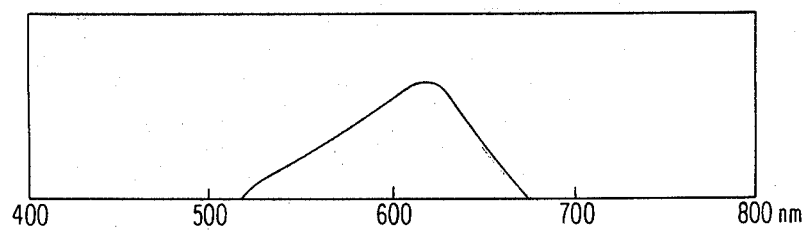
FIGS. 1, 2, 3, and 4 are spectral sensitivity spectra of photoconductive substances composed of poly-N-vinylcarbazole containing various diazastyryl dyes of the invention.

The alkyl group represented by $R_1$ is preferably an alkyl group having from 1 to 12 carbon atoms, and more preferably from 1 to 4 carbon atoms, for example, a methyl group, an ethyl group, a propyl group or a butyl group, etc.; $R_2$ is preferably hydrogen, an alkyl group or an alkoxy group having from 1 to 12 carbon atoms, and more preferably from 1 to 4 carbon atoms, for example, a methoxy group, an ethoxy group or a propoxy group, etc. $R_3$ and $R_4$ each represent an alkyl group having from 1 to 12 carbon atoms or a substituted alkyl group having from 1 to 18 carbon atoms, more preferably from 1 to 12 carbon atoms, and most preferably from 1 to 4 carbon atoms. Examples of such substituents include alkoxy groups having from 1 to 4 carbon atoms, aryloxy groups, such as a phenoxy group or a naphthoxy group, etc., a hydroxyl group, aryl groups such as a phenyl group, etc., a cyano group, and halogens such as chlorine, bromine, and fluorine. Examples of preferred alkyl groups having substituents represented by $R_3$ and $R_4$ include: (1) alkoxyalkyl, such as ethoxypropyl, methoxybutyl, or propoxy methyl, etc.; (2) aryloxyalkyl, such as phenoxyethyl, naphthoxymethyl or phenoxypentyl, etc.; (3) hydroxyalkyl, such as hydroxyethyl, hydroxypropyl, hydroxyoctyl or hydroxymethyl, etc.; (4) aralkyl such as benzyl, phenethyl or ω,ω-diphenyl alkyl, etc.; (5) cyanoalkyl, such as cyanopropyl, cyanobutyl or cyano ethyl, etc.; and (6) haloalkyl, such as chloromethyl, bromopentyl, or chlorooctyl, and so forth. Preferred nitrogen containing heterocyclic groups composed of $R_3$ and $R_4$ include heterocyclic groups represented by formulae (II), (III) and (IV)

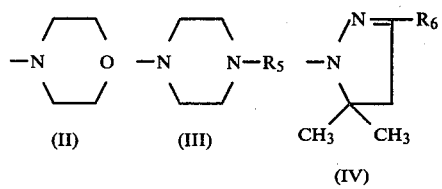

(II)    (III)    (IV)

and heterocyclic groups formed together with the phenylene group linking to the azo group, for example, a julolidyl group represented by formula (V)

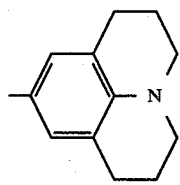

(V)

In these formulae, $R_5$ represents an alkyl group having from 1 to 12 carbon atoms, and preferably from 1 to 4 carbon atoms, such as a methyl group, an ethyl group, or a propyl group, etc.; and $R_6$ represents an alkyl group having from 1 to 12 carbon atoms, and preferably from 1 to 4 carbon atoms, such as a methyl group, an ethyl group, or a propyl group, etc., an alkenyl group having from 2 to 13 carbon atoms, and preferably from 2 to 5 carbon atoms, such as a vinyl group or a propenyl group, etc., or an alkenyl group having from 3 to 13 carbon atoms substituted by an alkyl group having from 1 to 4 carbon atoms, such as a 2-methyl-1-propenyl group, etc.

The benzothiazolium ring formed by A can be represented by formula (VI)

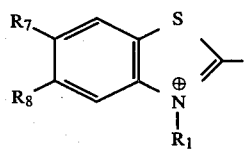

(VI)

wherein $R_1$ represents an alkyl group having from 1 to 12 carbon atoms, and $R_7$ and $R_8$ each represent hydrogen, an alkyl group having from 1 to 12 carbon atoms, and preferably from 1 to 4 carbon atoms such as a methyl group, an ethyl group, a propyl group, or a butyl group, etc., an alkoxy group having from 1 to 12 carbon atoms, and preferably from 1 to 4 carbon atoms, such as a methoxy group, an ethoxy group, a propoxy group or a butoxy group, etc., a halogen atom, such as chlorine or bromine, or an amido group (e.g.,

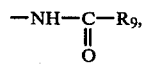

wherein $R_9$ represents an alkyl group having from 1 to 5 carbon atoms, such as a methyl group, an ethyl group, or a propyl group, etc.).

The thiazolium ring formed by A is represented by the following formula (VII).

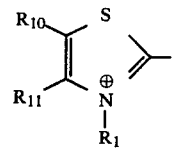

(VII)

$R_1$ represents the same group as in the above described $R_1$, and $R_{10}$ and $R_{11}$ can each represent the same groups as the groups represented by $R_7$ and $R_8$, and additionally a phenyl group, a substituted phenyl group, a substituted phenylsulfonyl group, or $R_{10}$ and $R_{11}$ together can represent a group of forming a ring. Example substituents of the substituted phenyl group and the substituted phenylsulfonyl group include alkyl groups having from 1 to 12 carbon atoms, and preferably from 1 to 4 carbon atoms, such as a methyl, ethyl, propyl, or butyl group, etc., alkoxy groups having from 1 to 12 carbon atoms, and preferably from 1 to 4 carbon atoms, such as a methoxy, ethoxy, propoxy, or butoxy group, etc., halogens such as chlorine or bromine, etc., and a nitro group. Preferred thiazolium groups having the phenyl group or the substituted phenylsulfonyl group and the thiazolium group formed by linking $R_{10}$ to $R_{11}$ are the groups

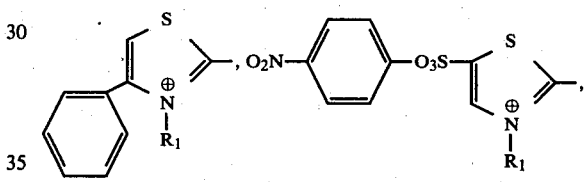

and 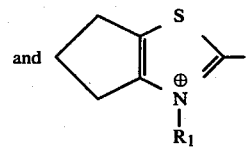

The imidazolium ring formed by A is represented by formula (VIII).

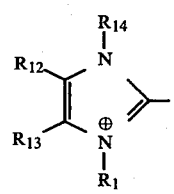

(VIII)

The triazolium ring formed by A is represented by formula (IX).

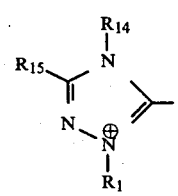

(IX)

The thiadiazolium ring formed by A is represented by formula (X).

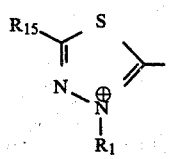 (X)

In the above described formulae (VIII), (IX) and (X), $R_1$ and $R_{14}$ represent an alkyl group having from 1 to 12 carbon atoms. $R_1$ and $R_{14}$ may be identical or different from each other. $R_{12}$, $R_{13}$, and $R_{15}$ each represent hydrogen, an alkyl group having from 1 to 12 carbon atoms, and preferably from 1 to 4 carbon atoms, such as a methyl group, an ethyl group or a propyl group, etc., a phenyl group, or a halogen such as chlorine or bromine, etc. $R_{12}$ and $R_{13}$ may be identical or different from each other, and together may form an aromatic ring, such as a benzene ring.

The pyridinium ring formed by A is represented by formula (XI).

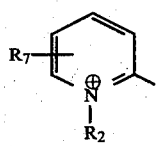 (XI)

wherein $R_2$ and $R_7$ represent each the same groups as described above therefor.

The imidazolium ring formed by A is represented by formula (XII)

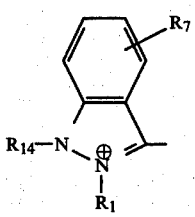 (XII)

wherein $R_1$, $R_7$, and $R_{14}$ each represent the same groups as described above therefor.

The indolenium ring formed by A is represented by formula (XIII)

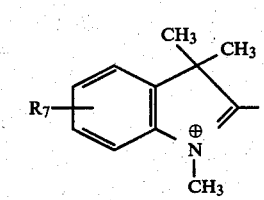 (XIII)

wherein $R_7$ represents the same groups as defined therefor in formula (VI).

Examples of these diazastyryl dyes include the following compounds, but the useful dyes are not limited thereto.

(1) 2-(p-Dimethylamino-phenylazo)-3-ethyl-6-methoxybenzothiazolium perchlorate

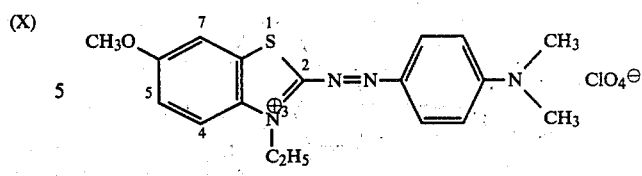

(2) 2-(9-Julolidylazo)-3-methylbenzothiazolium perchlorate

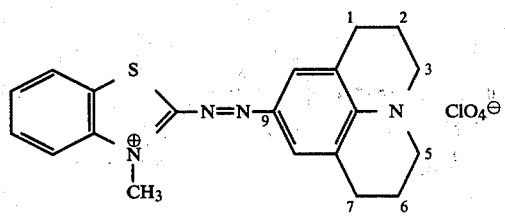

(3) 2-[p-(3,5,5-Trimethyl-pyrazolin-1-yl)phenylazo]-3-methylbenzothiazolium perchlorate

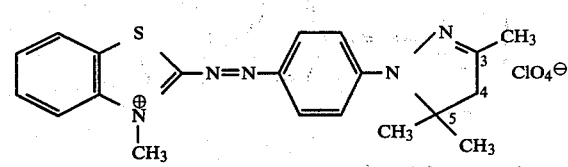

(4) 2-p-[3-(2-methyl-1-propenyl)-5,5-dimethyl-pyrazolin-1-yl]phenylazo-3-methylbenzothiazolium perchlorate

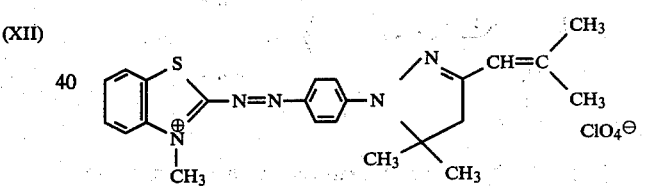

(5) 2-(p-Dimethylamino-phenylazo)-3-n-butyl-6-methoxybenzothiazolium tosylate

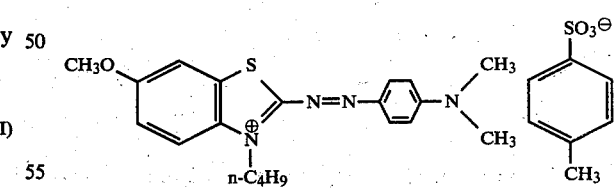

(6) 2-(p-Diethylaminophenylazo)-3-ethylthiazolium perchlorate

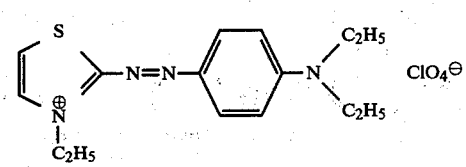

(7) 2-(9-Julolidylazo)-3-ethylthiazolium perchorate

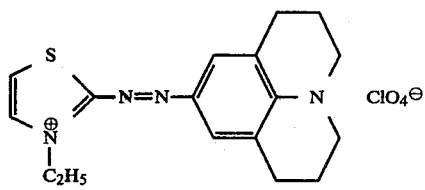

(8) 2-[p-(3,5,5-Trimethyl-pyrazolin-1-yl)phenylazo]-3-ethylthiazolium perchlorate

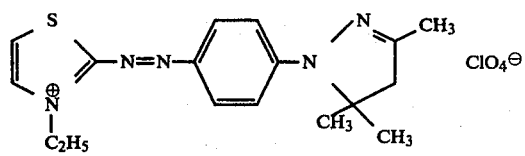

(9) 2-(p-Morpholinophenylazo)-3-ethylthiazolium perchlorate

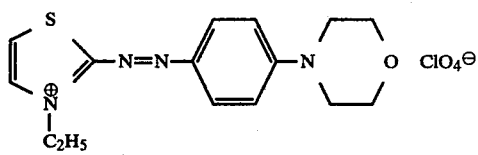

(10) 5-(p-Diethylaminophenylazo)-1,4-dimethyl-1,2,4-triazolium perchlorate

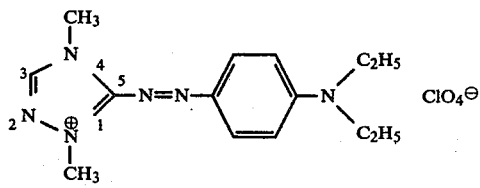

(11) 5-[p-(N-Methyl-N-benzylamino)phenylazo]-1-4-dimethyl-1,3-dimethyl-1,2,4-triazolium perchlorate

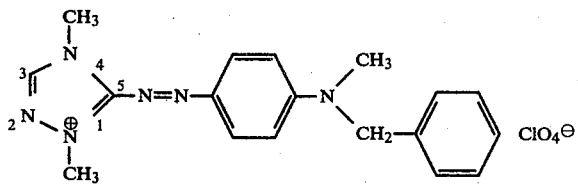

(12) 3-(p-Diethylaminophenylazo)-1,2-dimethyl-1H-indazolium perchlorate

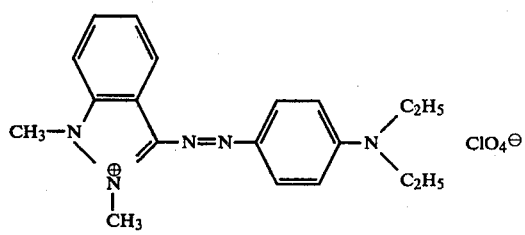

(13) 2-(p-Diethylaminophenylazo)-1,3-dimethylbenzimidazolium perchlorate

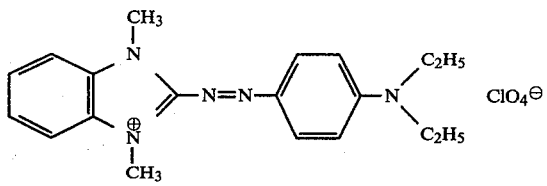

(14) 5-(p-Diethylaminophenylazo)-1-methyl-1,2,4-thiadiazolium perchlorate

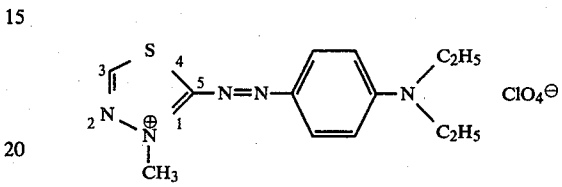

(15) 2-(p-Diethylaminophenylazo)-1-methyl-pyridinium perchlorate

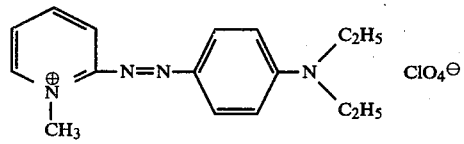

(16) 2-(p-Diethylaminophenylazo)-1-ethyl-3,3-dimethylindolenium perchlorate

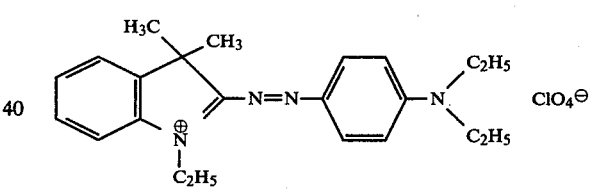

The diazastyryl dye compounds used in the present invention can be synthesized according to processes described in the documents described below. Processes for synthesizing dye compounds have been described in Japanese Patent Publication Nos. 2387/57, 2388/57, 14337/61, and 6933/59 for the case wherein A forms a benzothiazolium ring and a thiazolium ring; in German Pat. Nos. 1,137,816 and 1,098,642 for the case wherein A forms an imidazolium ring; in Japanese Patent Publication 8085/57 for the case wherein A forms a triazolium ring, in British Pat. Nos. 884,885 and 858,181 for the case wherein A forms a thiadiazolium ring, in Japanese Patent Publication 7534/57 and U.S. Pat. Nos. 2,893,816 and 2,938,908 for the case wherein A forms a pyridinium ring, and in Japanese Patent Publication No. 14295/63 for the case wherein A forms an indazolium ring. Dye Compounds for the case wherein A forms an indolenium ring can be produced by diazotizing heterocyclic hydrazone with sodium nitrite and sulfuric acid and coupling the purified diazonium salt with aniline, according to the process described in Chemische Berichte 609, 160 (1957) by S. Hünig and H. Balli. An example of production is shown in the following.

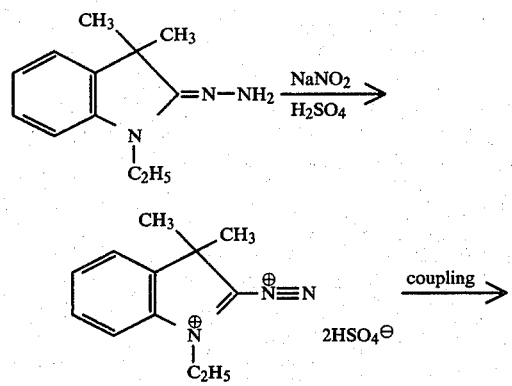

Spectral sensitizer of the present invention
(in the case wherein A forms an indolenium ring)

The dye compounds of the present invention have properties showing large decay of the initial electric potential by light as compared to the prior sensitizing dyes and the prior styryl dyes, when they are used in photoconductive compositions. This fact means that the dye compounds of the present invention are particularly excellent as sensitizers. This fact is believed to be originated from an electron attractive effect of the azo group in the dye compounds of the present invention. In addition, the sensitizers of the present invention are excellent in stability to light, which is one of noticeable effects. Accordingly, they do not fade by the lapse of long time and properties as the sensitizers do not deteriorate.

Using the sensitizers of the present invention, it is possible to provide a desired spectral sensitization characteristic selected from blue-sensitization, green-sensitization, and red-sensitization by suitably combining a diazo moiety with a coupling moiety. Furthermore, the sensitizers of the present invention have advantages that they not only can be easily available but they are also economically advantageous in cost.

Examples of embodiments of using the diazastyryl dye compound sensitizers of the present invention include photoconductive compositions in which the diazastyryl dyes of the invention are used together with various photoconductive substances. The sensitizers of the present invention contribute to highly sensitizing photoconductive substances and they provide particularly excellent effects for organic photoconductive substances.

Many compounds are known as organic photoconductive substances. Among them, the following compounds show an excellent sensitization effect by the sensitizers of the present invention.

(A) Vinylcarbazoles, including, for example, vinylcarbazole, poly-9-vinylcarbazole, 9-vinylcarbazole copolymers, 3-nitro-9-vinylcarbazole copolymers, nitrated poly-9-vinyl carbazole, poly-9-vinyl-3-aminocarbazole, 3-N-methylamino-9-vinylcarbazole copolymers, halogenated vinylcarbazoles, 3,6-dibromo-9-vinylcarbazole copolymers, brominated poly-9-vinylcarbazole, 3-iodo-9-vinylcarbazole copolymers, poly-3,6-diiodo-9-vinylcarbazole, poly-3-benzylideneamino-9-vinylcarbazole, poly-9-propenylcarbazole, graft copolymer of 9-vinylcarbazole and ethyl acrylate (molar ratio: 90:10), vinylanthracene-9-vinylcarbazole copolymer, and homopolymers and copolymers of 2-(or 3-)vinyl-9-alkylcarbazole (where the alkyl group is a primary alkyl group such as methyl, ethyl or propyl, etc.).

(B) Aromatic amino derivatives, including, for example, aminopolyphenyl allylideneazines, N,N'-dialkyl-N,N'-dibenzyl phenylenediamine, N,N,N',N'-tetrabenzyl-p-phenylenediamine, N,N'-diphenyl-p-phenylenediamine, N,N'-dinaphthyl-p-phenylenediamine and 4,4'-bis-dimethylaminobenzophenone, etc.

(C) Polyarylalkane derivatives, including leuco bases of diaryl- or triarylmethane dye salts, 1,1,1-triarylalkanes in which the alkane portion has at least two carbon atoms, and tetraarylmethanes. The latter two derivatives are non-leuco bases wherein at least one of aryl groups bonding to the alkane or methane portion is substituted by an amino group. Examples thereof include 4',4''-bis-(diethylamino)-2',2''-dimethyltriphenylmethane, 4,4''-bis-(dimethylamino)-2',2''-dimethyl-4-methoxytriphenyl methane, 4',4''-bis-(benzylethylamino)-2',2''-dimethyltriphenylmethane, 4',4''-bis-(diethylamino)-2',2''-diethoxytriphenyl methane, 2',2''-dimethyl-4,4',4''-tris-(dimethylamino)triphenyl methane and 4,4'-bis-(dimethylamino)-1,1,1-triphenylethane, etc.

(D) Compounds having heterocyclic groups including, for example, oxadiazole, ethylcarbazole, N-n-hexylcarbazole, 5-aminothiazole, 4,1,2-triazole, imidazolone, oxazole, imidazole, pyrazoline, imidazolidine, polyphenylene thiazole, 6,6-methoxyphenazine, α,ω-bis-(N-carbazole)alkane derivatives and pyrazolinopyrazoline derivatives, etc.

(E) Compounds having condensed rings, including, for example, benzothiazole, benzimidazole, benzoxazoles such as 2-(4'-diaminophenyl)benzoxazole and 2-(4-dimethylaminophenyl)benzoxazole, etc., aminoacridne, quinoxaline, diphenylene hydrazones, pyrrocoline derivatives and 9,10-dihydroanthracene derivatives, etc.

(F) Compounds having double bonds, including, for example, acyl hydrazones, ethylene derivatives, 1,1,6,6-tetraphenylhexatriene and 1,1,5-triphenyl-pent-1-ene-4-ine-3-ol, etc.

(G) Condensation products, including, for example, condensation products of aldehyde and aromatic amine, reaction products of secondary aromatic amine and aromatic halogenide, polypyrromethanoimide and poly-p-phenylene-1,3,4-oxadiazole, etc.

(H) Vinyl polymers, including, for example, α-alkylacrylic acid amide polymers, polyvinyl-acridine, poly-[1,5-diphenyl-3-(4-vinylphenyl)-2-pyrazoline], poly-(1,5-diphenylpyrazoline), polyacenaphthylene, substituted polyacenaphthylenes, polyvinylanthracene and poly-2-vinyldibenzothiophene, etc.

(I) Examples of useful organic photoconductive oligomers include the following.

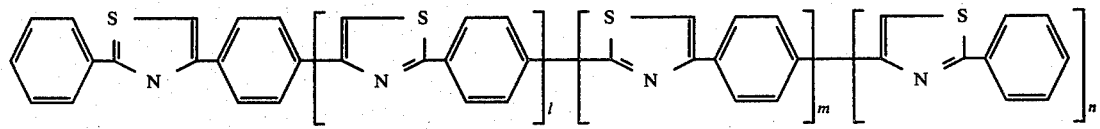

(where l, m and n are 0 or 1, and have a relation of l≧m≧n) More particularly, examples thereof include p-bis-(2-phenyl-4-thiazolyl)-benzene as a compound having-five rings, 2,4-bis-[4-(2-phenyl-4-thiazolyl)-phenyl]thiazole as a compound having seven rings and 1,4-bis 4-[4-(2-phenyl-4-thiazolyl)phenyl]-thiazolyl benzene as a compound having nine rings, etc.

The amount of the sensitizers used in the present invention vary according to the particular sensitizers and organic conductive substances used. Generally, good results can be obtained if the dye compound of the present invention are used in an amount of from 0.005 to 10 parts by weight and from about 1 to 80 parts by weight of the photoconductive substance. Further, a preferred range for the dye compound is from 0.01 to 1 part by weight and from about 1 to 80 parts by weight of the photoconductive substance.

These sensitizers are generally used by dissolving the sensitizer in a solvent which dissolves both the sensitizer and the organic photoconductive substances, such as methylene chloride, ethylene chloride, chloroform, tetrahydrofuran, N,N-dimethylformamide, cyclopentanone, benzene or toluene, etc.

In the organic photoconductive compositions, film forming photoconductors such as poly-(vinylcarbazole) etc. can be used as a material which functions as a photoconductive substance and a binder at the same time. Further, electrically insulating film forming substances can be used as a binder. The amount of the binder used is 0.2 to 100 parts by weight, and preferably from 0.3 to 3 parts by weight per 1 part by weight of the organic photoconductor. Preferred binders include polymers such as polystyrene, poly-(methylstyrene), styrene-butadiene copolymer, poly-(vinyl chloride), poly-(vinylidene chloride), poly-(vinyl acetate, vinyl acetate-vinyl chloride copolymer, poly-(vinyl acetal), poly-acrylic acid ester, polymethacrylic acid ester, polyesters such as poly-(ethylene alkaryloxy-alkylene terephthalate), phenol formaldehyde resin, polyamide and polycarbonate, etc. Further, it is possible to add, if desired, plasticizers and other additives to the photoconductive compositions of the present invention. These additives are preferred to use by dispersing or dissolving in solvents.

The photoconductive composition thus produced can be applied in a solution state or as a dispersion in a solvent to an electrically conductive base, and dried or the above described components can be applied by melting on the electrically conductive base, or a photosensitive membrane produced from a solution or dispersion of the above described photoconductive composition can be used as a self-supporting film for the photosensitive material. In addition, dispersions which were obtained by dispersing particles prepared from the solution of the photoconductive composition of the present invention by means of a miniature spray device in an insulating liquid containing saturated hydrocarbons such as decane, dodecane, octane, paraffin or isooctane, etc., for example, long chain alkyl hydrocarbon can be used for a photo-electrophoretic process.

Examples of electrically conductive bases include paper treated so as to be electrically conductive; aluminium-paper laminate; metal foils such as aluminium foil or zinc foil, etc.; metal plates such as an aluminium, copper, zinc, brass or zinc plated plate, etc.; and bases prepared by applying metal such as chromium, silver, nickel, or aluminium to conventional photographic bases such as paper, cellulose acetate or polystyrene, etc., by vacuum evaporation. Preferably, paper, cellulose acetate or polyethylene terephthalate on which metal such as chromium, silver, nickel or aluminium or indium oxide is deposited by vacuum evaporation is used. The thickness of the photoconductive composition coated on the base can be widely varied.

Figure 2:
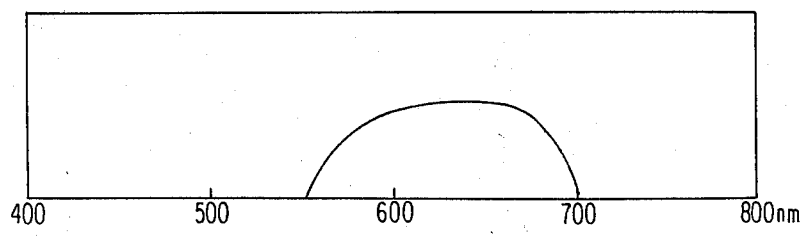
Figure 3:
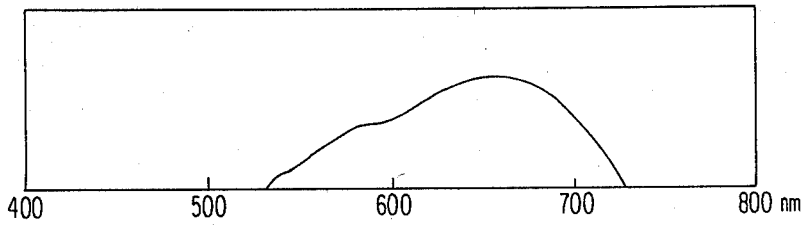
Figure 4:
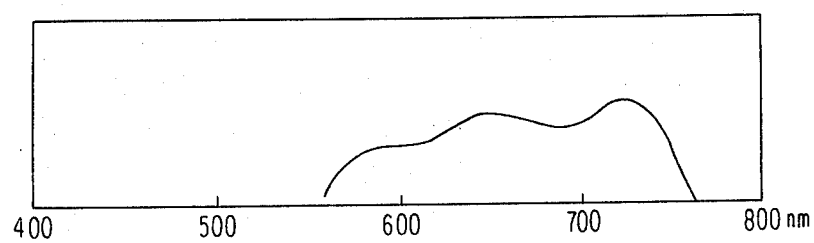

Generally, good results can be obtained when the thickness of the photoconductive layer is in a dry coating state is in the range of from about 1 to 200 microns. Preferably the thickness in a dry coating state is in the range of from about 2 to 50 microns. FIGS. 1, 2, 3 and 4 show spectral sensitization spectra in the case wherein the sensitizers (VI), (I), (III) and (IV) of the present invention are used as spectral sensitizers of poly-N-vinylcarbazole.

In the following, examples in which diazastyryl dyes of the present invention are used as spectral sensitizers in the photoconductive composition are described.

EXAMPLES 1–13

6 g of poly-N-vinylcarbazole (trade name Luvican 170, produced by BASF; limiting viscosity $(\eta) = 1.18$ at 25° C. in tetrahydrofuran) was dissolved in 120 ml of purified ethylene chloride to produce a mother liquor.

To 4 g of this mother liquor were added solutions of diazastyryl dyes (I)–(XII) in ethylene chloride which were controlled so as to be $10^3$ mols per mol of carbazole ring unit, to produce sensitive solutions.

The sensitive solutions were applied to electrically conductive transparent bases having a surface resistivity of $10^3$ Ω and comprising a vacuum evaporation membrane of indium oxide on a polyethylene terephthalate base having a thickness of 100μ by means of a wire-round rod which is composed of a rod rounded by wire and used for coating, and dried to produce photosensitive materials having a sensitive layer having a thickness of about 2μ. Each sample was positively charged by corona discharging so as to have 300 V of the surface electric potential. It was then exposed to light with using a tungsten light source of 3000° K. to obtain an illumination of 4.5 lux at the surface of the sensitive layer. Half-decay exposure amount $E_{50}$ (lux.-second) which represents an exposure amount sufficient to reduce the initial electric potential at the surface of the sensitive layer by half was measured. The results are shown in Table 1.

TABLE 1

| | Dye | $E_{50}$ (lux . second) | $\lambda_{max}$* |
|---|---|---|---|
| Comparative Example 1 | None | 45000 | — |
| 2 | Comparative dye** | 96.4 | 546 |
| Example 1 | Dye 1 | 13.5 | 610 |
| 2 | 2 | 13.5 | 604 |
| 3 | 3 | 9.5 | 645 |
| 4 | 4 | 12.2 | 681, 645 |
| 5 | 5 | 28.4 | 611 |
| 6 | 6 | 18.9 | 600 |
| 7 | 7 | 28.4 | 609 |
| 8 | 8 | 16.2 | 637 |
| 9 | 9 | 20.3 | 601 |
| 10 | 10 | 50.0 | 546 |

TABLE 1-continued

| Dye | E$_{50}$ (lux · second) | $\lambda_{max}$* |
|---|---|---|
| 11 | 11 | 52.7 | 544 |

*Absorption maximum value (nm) in ethylene chloride solution.
**Comparative dye

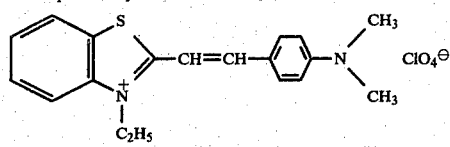

In the above Table 1, for example, 45000 of the half-decay exposure amount E$_{50}$ represents that it takes 10,000 seconds under 4.5 lux illumination to reduce the initial electric potential of 300 V at the surface of the sensitive layer to 150 V.

EXAMPLE 14

A coating solution was produced using 0.15 g of polycarbonate (trade name: LEXAN 121, produced by General Electric Co.; polymer produced by polycondensation of bisphenol A and carbonic acid derivatives), 0.15 g of 4,4'-bis-diethylamino-2,2'-dimethyltriphenyl methane (organic photoconductor), 0.0016 g of Dye (II): 2-(9-julolidylazo)-3-methylbenzothiazolium perchlorate and 10 ml of methylene chloride. This solution was applied by the same manner as in Examples 1–13. The result of the measurement is shown in Table 2.

When a sample which did not contain the dye was examined for the purpose of comparison, E$_{50}$ could not be measured because of very low sensitivity.

TABLE 2

| Example | Dye | E$_{50}$ | $\lambda_{max}$* |
|---|---|---|---|
| 14 | 2 | 480 | 604 |

While the invention has been described in detail and with reference to specific embodiment thereof, it will be apparent to one skilled in the art that various changes and modifications can be made therein without departing from the spirit and scope thereof.

What is claimed is:

1. A photoconductive composition comprising an organic photoconductive substance and a spectral sensitizer represented by formula (I)

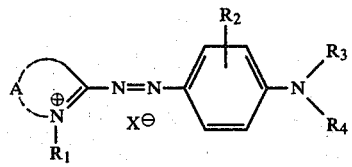

wherein R$_1$ represents an alkyl group, R$_2$ represents hydrogen, an alkyl group or an alkoxy group, R$_3$ and R$_4$ each represent an alkyl group, or R$_3$ and R$_4$ together represent a group completing a nitrogen-containing heterocyclic group, and A represents a group completing a (a) benzothiazolium ring, (b) thiazolium ring, (c) imidazolium ring, (d) triazolium group, (e) thiadiazolium ring, (f) pyridinium ring, (g) indazolium ring, or (h) indolenium ring.

2. A photoconductive composition as in claim 1 wherein R$_1$ represents an alkyl group having from 1 to 12 carbon atoms, R$_2$ represents hydrogen, an alkyl group or an alkoxy group having from 1 to 12 carbon atoms, and R$_3$ and R$_4$ each represent an alkyl group having from 1 to 12 carbon atoms, a substituted alkyl group having from 1 to 18 carbon atoms, or R$_3$ and R$_4$ together represent a group completing a nitrogen-containing heterocyclic group.

3. The photoconductive composition as in claim 1 wherein R$_3$ and R$_4$ together represent a group completing a nitrogen-containing heterocyclic group represented by one of formulae (II), (III) or (IV), or R$_3$ and R$_4$ together with the phenylene group bonding to the azo group in formula (I) from a heterocyclic group represented by formula (V)

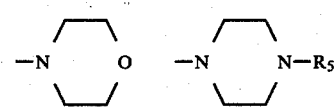

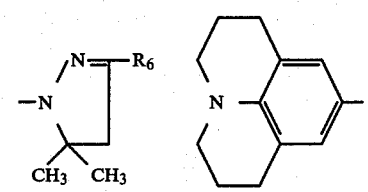

wherein R$_5$ represents an alkyl group having from 1 to 12 carbon atoms, and R$_6$ represents an alkyl group having from 1 to 12 carbon atoms, an alkenyl group having from 2 to 13 carbon atoms, or an alkenyl group having from 3 to 13 carbon atoms substituted by an alkyl group having from 1 to 4 carbon atoms.

4. A photoconductive composition as in claim 1 wherein the ring completed by A in formula (I) is selected from rings represented by formulae (VI), (VII), (VIII), (IX), (X), (XI), (XIII), and (XIII)

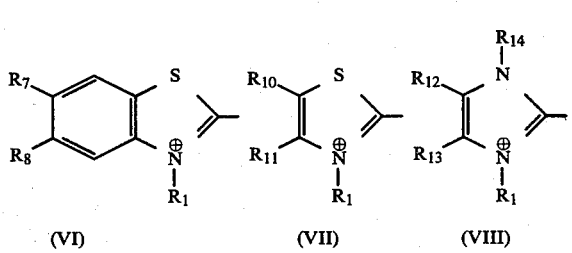

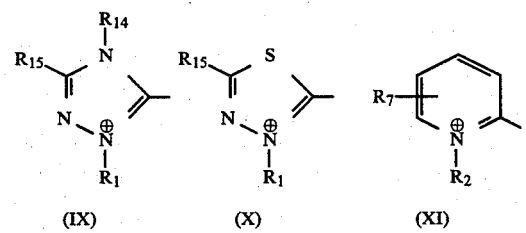

-continued (XII): structure with R7, R14—N, R1, ⊕N (XIII): structure with R7, CH3, CH3, ⊕N—CH3 wherein $R_1$ and $R_{14}$ represent an alkyl group having from 1 to 12 carbon atoms, $R_7$, $R_8$, $R_{10}$, and $R_{11}$ each represent hydrogen, an alkyl group having from 1 to 12 carbon atoms, an alkoxy group having from 1 to 12 carbon atoms, a halogen, or an amido group, and $R_{10}$ and $R_{11}$ can each additionally represent an phenyl group, a substituted phenyl group, a substituted phenylsulfonyl group, or $R_{10}$ and $R_{11}$ together can represent a group forming a ring, and $R_{12}$, $R_{13}$, and $R_{15}$ each represent hydrogen, an alkyl group having from 1 to 12 carbon atoms, a phenyl group, a halogen, and $R_{12}$ and $R_{13}$ together can represent a group forming an aromatic ring.

5. A photoconductive composition as in claim 1 wherein the substituents of the substituted phenyl group and substituted phenylsulfonyl group are selected from alkyl groups having from 1 to 12 carbon atoms, alkoxy groups having from 1 to 12 carbon atoms, halogens, or a nitro group.

6. A photoconductive composition according to claim 1, 2, 3, 4, or 5 comprising from 0.05 to 10 parts by weight of spectral sensitizer and from about 1 to 80 parts by weight of photoconductive substance.

7. A photosensitive material comprising a photoconductive composition said composition comprising a photoconductive substance and a spectral sensitizer, provided on a base, or comprising a membrane produced from said photoconductive composition, wherein said spectral sensitizer is represented by formula (I)

(I): structure showing A, ⊕N—R1, X⊖, N=N—phenyl with R2, R3, R4 wherein $R_1$ represents an alkyl group, $R_2$ represents hydrogen, an alkyl group, or an alkoxy group, $R_3$ and $R_4$ each represent an alkyl group or $R_3$ and $R_4$ together represent a group completing a nitrogen-containing heterocyclic group, and A represents a group completing a (a) benzothiazolium ring, (b) thiazolium ring, (c) imidazolium ring, (d) triazolium ring, (e) thiadiazolium ring, (f) pyridinium ring, (g) indazolium ring or (h) indolenium ring.

8. A photosensitive material as in claim 7 wherein $R_1$ represents an alkyl group, $R_2$ represents hydrogen, an alkyl group or an alkoxy group, $R_3$ and $R_4$ each represent an alkyl group, or $R_3$ and $R_4$ together represent a group completing nitrogen-containing heterocyclic group and A represents a group completing a (a) benzothiazolium ring, (b) thiazolium ring, (c) imidazolium ring, (d) triazolium group, (e) thiadiazolium ring, (f) pyridinium ring, (g) indazolium ring, or (h) indolenium ring.

9. A photosensitive material as in claim 8 wherein $R_3$ and $R_4$ together represent a group completing a nitrogencontaining heterocyclic group represented by one of formula (II), (III), or (IV), or $R_3$ and $R_4$ together with the phenylene group bonding to the azo group in formula (I) form a heterocyclic group represented by formula (V)

(II): —N with morpholine-like ring (O)
(III): —N with piperazine-like ring N—R5
(IV): —N with ring containing N—R6, CH3 CH3
(V): fused bicyclic structure with N where $R_5$ represents an alkyl group having from 1 to 12 carbon atoms, and $R_6$ represents an alkyl group having from 1 to 12 carbon atoms, an alkenyl group having from 2 to 13 carbon atoms, or an alkenyl group having from 3 to 13 carbon atoms substituted by an alkyl group having from 1 to 4 carbon atoms.

10. A photosensitive material as in claim 7 wherein the ring completed by A in formula (I) is selected from rings represented by formulae (VI), (VII), (VIII), (IX), (X), (XI), (XII), and (XIII)

(VI): structure with R7, R8, S, ⊕N—R1
(VII): structure with R10, R11, S, ⊕N—R1
(VIII): structure with R12, R13, R14—N, ⊕N—R1
(IX): structure with R15, R14—N, N, ⊕N—R1
(X): structure with R15, S, N, ⊕N—R1
(XI): structure with R7, pyridinium ⊕N—R2
(XII): structure with R7, R14—N, ⊕N—R1

-continued

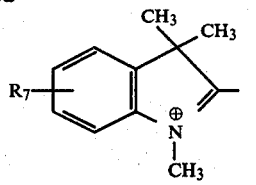

(XIII)

wherein $R_1$ and $R_{14}$ represent an alkyl group having from 1 to 12 carbon atoms, $R_7$, $R_8$, $R_{10}$, and $R_{11}$ each represent hydrogen, an alkyl group having from 1 to 12 carbon atoms, an alkoxy group having from 1 to 12 carbon atoms, a halogen, or an amido group, and $R_{10}$ and $R_{11}$ can each additionally represent an phenyl group, a substituted phenyl group, a substituted phenylsulfonyl group, or $R_{10}$ and $R_{11}$ together can represent a group forming a ring, and $R_{12}$, $R_{13}$, and $R_{15}$ each represent hydrogen, an alkyl group having from 1 to 12 carbon atoms, a phenyl group, a halogen, and $R_{12}$ and $R_{13}$ together can represent a group of forming an aromatic ring.

11. A photosensitive material as in claim 10 wherein the substituents of the substituted phenyl group and substituted phenylsulfonyl group are selected from alkyl groups having from 1 to 12 carbon atoms, alkoxy groups having from 1 to 12 carbon atoms, halogens, or a nitro group.

* * * * *